United States Patent
Valembois

(10) Patent No.: US 6,364,074 B2
(45) Date of Patent: *Apr. 2, 2002

(54) MECHANICAL DEVICE HAVING TWO MODES OF DISPLACEMENT

(75) Inventor: Guy Valembois, Blagnac (FR)

(73) Assignee: Etienne Lacroix Tous Artifices S.A. (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,971
(22) Filed: Feb. 1, 1999
(30) Foreign Application Priority Data Feb. 2, 1998 (FR) .............................. 98 01149

(51) Int. Cl.⁷ .............................................. F16F 11/00
(52) U.S. Cl. ..................... 188/271; 188/136; 267/205
(58) Field of Search ........................... 188/271, 136, 188/129, 166; 267/205, 214, 134; 89/42.01, 44.01, 44.02, 14.3, 198

(56) References Cited

U.S. PATENT DOCUMENTS

| 2,459,537 A | | 1/1949 | Oberstadt | |
| 2,539,275 A | * | 1/1951 | Sahlin et al. | 89/44.01 |
| 3,783,738 A | * | 1/1974 | Pelat | 188/136 X |
| 5,655,632 A | * | 8/1997 | Valembois | 188/136 |

FOREIGN PATENT DOCUMENTS

| BE | 548536 | 6/1956 |
| DE | 2240943 | 2/1974 |
| EP | 0407755 | 1/1991 |
| FR | 1122015 | 8/1956 |
| FR | 2697881 | 5/1994 |
| FR | 2333165 | 6/1997 |
| SU | XP-002080223 | 9/1981 |

OTHER PUBLICATIONS

NASA: "Improved Coulomb–Friction Damper" No. 12, part F, 12/85 p. 1424.

* cited by examiner

Primary Examiner—Douglas C. Butler
Assistant Examiner—Pamela J. Rodriguez
(74) Attorney, Agent, or Firm—Blakely Sokoloff Taylor & Zafman

(57) ABSTRACT

A mechanical device for controlling changeover between two modes of relative displacement between two objects comprising: two assemblies capable of moving in guided relative translation, one assembly being fixed, and the other assembly moving, the device further comprising: resilient controller interposed between the two assemblies with a controlled clearance to define the mode of relative displacement; and an inertial mass associated with one of the assemblies and adapted to act selectively on the controller as a function of the time profile of moving assembly displacement in order to modify the clearance and the mode of relative displacement.

14 Claims, 3 Drawing Sheets

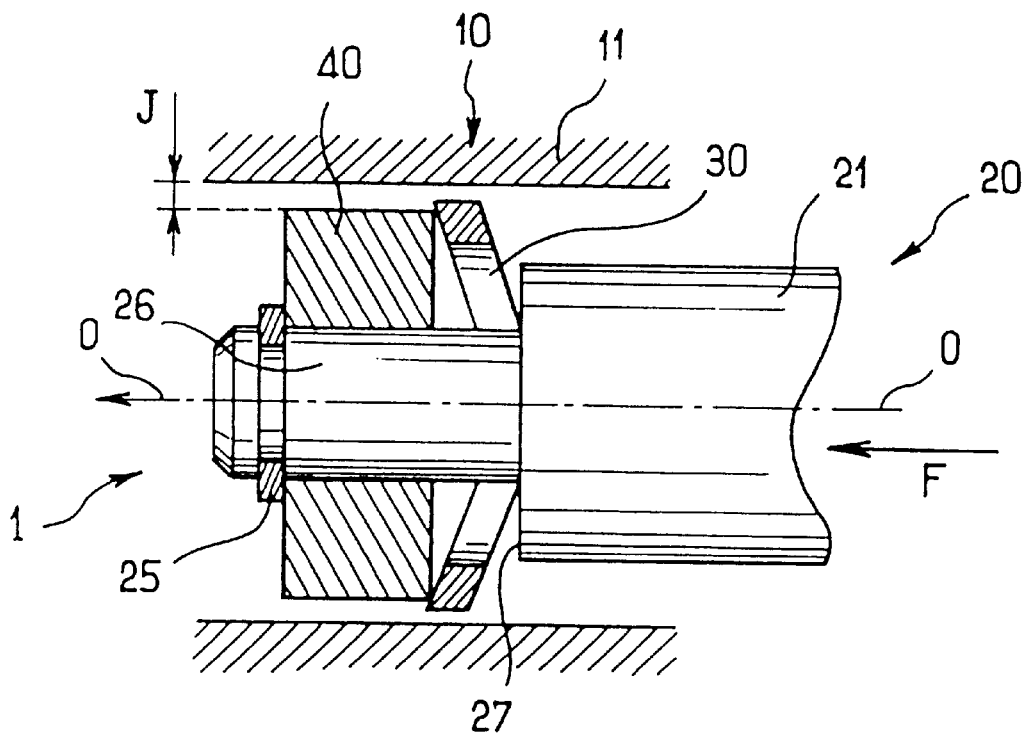
FIG_1
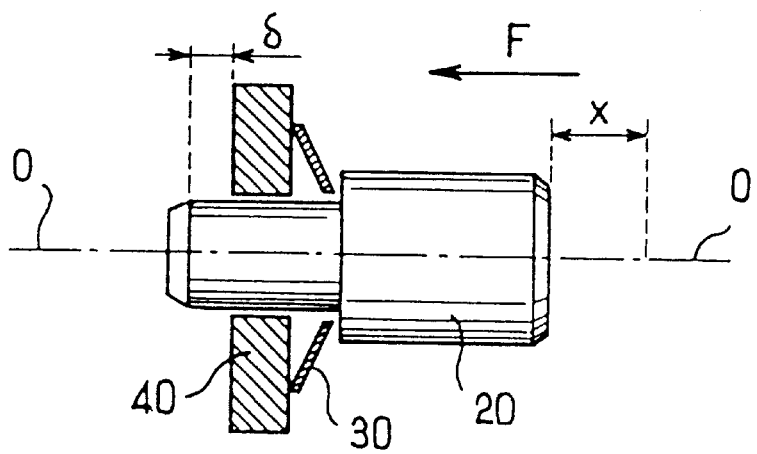
FIG_2

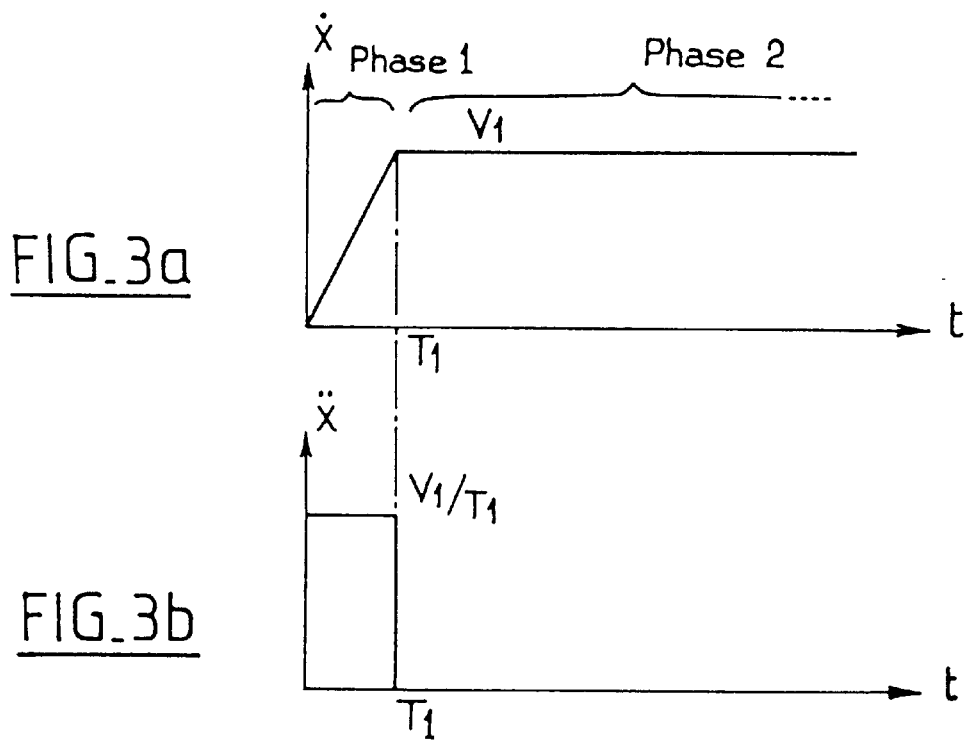
FIG.3a
FIG.3b
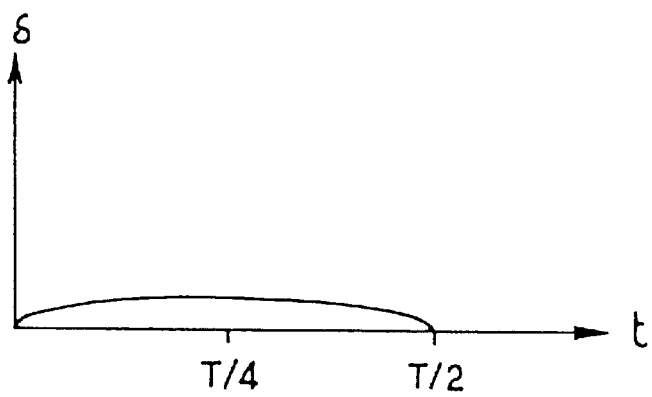
FIG.4

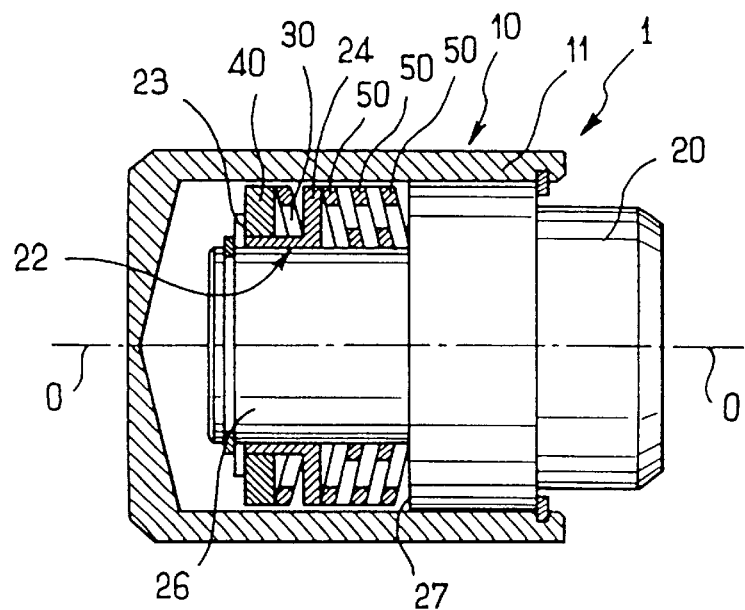
FIG_5
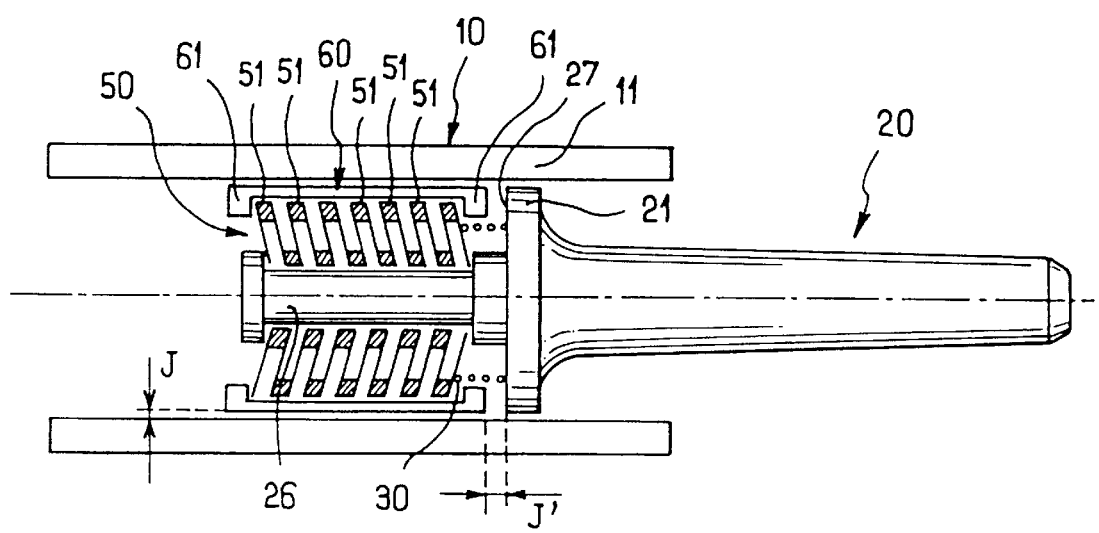
FIG_6

MECHANICAL DEVICE HAVING TWO MODES OF DISPLACEMENT

The present invention relates to the field of mechanical systems for controlling displacement. For example a device of the invention can be used to control rapidly accelerated displacement that could give rise to an operational problem or to a safety problem.

More particularly, but in non-limiting manner, the device can be used in high-impulse projectile launchers that need to have two different dynamic behaviors in damping.

BACKGROUND OF THE INVENTION

The invention is particularly, but not exclusively, applicable to friction dampers of the type described in document FR 2 697 881. A damper device of that type comprises a fixed portion, a moving portion, and friction means interposed between the fixed portion and the moving portion.

OBJECTS AND SUMMARY OF THE INVENTION

The object of the invention is to improve the dynamic behavior in damping. This object is achieved by a mechanical device that has two modes of relative displacement between one assembly and another, with the transition between the two modes being controlled and determined by the time profile of the relative displacement.

More precisely, the object of the invention is to propose a mechanical device making it possible to manage response to external stress as a function of the amplitude of the impulse generated:

- if the external stress generates low impulse (below a pre-established threshold), then the system should remain in a first relative displacement mode, i.e. it should move freely;
- if the external stress generates a high impulse (greater than a pre-established threshold), then the system must change over to a second relative displacement mode, i.e. with damping or blocking.

In the context of the present invention, this object is achieved by a mechanical device for controlling changeover between two modes of relative displacement between two objects comprising:

two assemblies capable of moving in guided relative translation, one assembly being said to be fixed, and the other being said to be moving, the device further comprising:

resilient control means interposed between the two assemblies with a controlled clearance to define the mode of relative displacement; and an inertial mass associated with one of the assemblies and adapted to act selectively on the control means as a function of the time profile of moving assembly displacement in order to modify the clearance and the mode of relative displacement.

BRIEF DESCRIPTION OF THE DRAWINGS

Other characteristics, objects, and advantages of the present invention appear on reading the following detailed description with reference to the accompanying drawings that are given as non-limiting examples, and in which:

FIG. 1 is a diagrammatic midsection through a heuristic model of the device of the-invention;

FIG. 2 is a diagram showing the relative displacements to which the inertial mass and the moving assembly of the device of the invention are subjected under the effect of an impulse;

FIG. 3 shows the relative displacement profile of the moving assembly relative to the fixed assembly in a device of the invention under the effect of a particular type of impulse as described below; FIG. 3a shows in particular the speed of the moving element as a function of time, while FIG. 3b shows the acceleration of the moving assembly as a function of time;

FIG. 4 shows the relative displacement δ of the moving mass relative to the moving assembly, as a function of time;

FIG. 5 is a diagrammatic midsection of a particular, non-limiting embodiment of the device of the invention; and FIG. 6 is a diagrammatic midsection of another particular, non-limiting embodiment of the device of the invention.

MORE DETAILED DESCRIPTION

FIG. 1 is a diagram to which reference is made for describing the mechanical device 1 of the invention. This diagram shows a fixed assembly 10, a moving assembly 20, resilient control means 30, and an inertial mass 40.

By way of example, the fixed assembly 10 comprises a hollow circularly-symmetrical fixed cylinder 11.

The moving assembly 20 comprises a solid circularly-symmetrical moving cylinder 21 of outside diameter smaller than the inside diameter of the fixed cylinder 11 so as to allow it to move freely inside the fixed cylinder along its axis O—O. The moving cylinder 21 is provided with a coaxial portion of reduced diameter 26 that is likewise cylindrical. The reduced-diameter portion 26 has a free end, and its opposite end terminates on an abutment 27. The resilient control means 30 and the inertial mass 40 are engaged on the reduced-diameter portion 26. The resilient control means 30 are interposed between the mass 40 and the abutment 27. These resilient control means 30 and the mass 40 are held on the reduced-diameter portion 26 of the moving assembly 20 by a fixing element 25. For example, the fixing element 25 can be a spring clip or a split washer.

The inertial mass 40 is a circularly-symmetrical hollow cylinder, of outside diameter smaller than the inside diameter of the cylinder 11 of the fixed assembly 10, so as to enable it to move freely along the axis inside the fixed cylinder. The inertial mass 40 is carried by the moving assembly 20 with its inside diameter being slightly greater than the outside diameter of the reduced-diameter portion 26 of the moving cylinder 21 so as to leave the mass free to move axially thereon.

Resilient control means 30 are implemented in this case in the form of a spring washer, e.g. of the Siam-Ringspann type. At rest, a clearance J is left between the resilient control means 30 and the fixed assembly 10.

The principle on which the above-described device operates is essentially as follows.

If the external stress transmits a low amplitude impulse to the moving assembly 20 along the axis O—O in the direction indicated by arrow F, the displacement of the moving assembly 1 is transmitted to the mass 40 without deforming the resilient control means 30 sufficiently to close up the clearance J. The cylinder 21 and the moving assembly 20 can then move freely inside the cylinder 11 of the fixed assembly 10. The device of the invention remains in a first relative displacement mode.

However, if the moving assembly 20 is subjected to a relatively high impulse along the axis O—O and in the direction given by arrow F, then the displacement of the moving assembly 20 is transmitted to the inertial mass 40 via the resilient control means 30. However, the mass 40 opposes such movement. The resilient control means 30 are compressed, thereby expanding radially and closing up the clearance J. The resilient control means 30 then come into contact with the wall of the cylinder 11. The device of the invention has then changed over to a second relative displacement mode. This second relative displacement mode is generally a damped mode, but it can also be desired for displacement to be blocked.

Depending on their nature, the resilient control means 30 can act directly on the wall of the cylinder 11 to damp or block displacement in the second relative displacement mode between the fixed assembly 10 and the moving assembly 20. However, in a preferred relative displacement mode of the device of the invention, friction or blocking means are interposed between the resilient control means 30 and the wall of the cylinder 11. An example of friction means 60 is described below with reference to FIG. 6. The nature of the second relative displacement mode is determined by the type of resilient control means 30 used. These means damp or block relative displacement between the fixed and moving assemblies 10 and 20 depending on whether they are designed to operate by buckling or by wedging. If they are designed to buckle, a limiting friction force is quickly reached and then remains more or less constant over the remainder of the displacement. Buckling can therefore be used:

- as means for controlling the changeover; and
- as pressure means for damping purposes.

These two functions can be separate or combined (FIG. 6).

Otherwise, the resilient control means 30 are designed for wedging, so that the friction force increases quickly and continuously up to a limit value when relative displacement of the two assemblies increases. Above the limit value, the friction forces are large enough to block relative displacement.

Under such circumstances, the resilient control means can also be designed to give way above some predetermined threshold force, above which the apparatus including the mechanical device 1 runs the risk of being damaged. The control means then act as safety means in the event of excess force. The safety means can also be designed so that after giving way to excess force, further use of the apparatus including the mechanical device 1 of the invention is prevented.

It can thus be seen that the mechanical device of the invention serves essentially to make it possible to change over from a free displacement mode to a displacement mode that is damped, or in the limit, blocked. This changeover depends on the dynamic behavior of the assembly comprising the inertial mass 40 and the resilient control means 30. Adjustment of this dynamic behavior makes it possible to obtain changeover between the two relative displacement modes under desired displacement time profiles.

Numerous variants of the mechanical device 1 of the invention can operate on the above-described principle.

As an indication, we develop calculations below for obtaining values for the mass m of the inertial mass 40 and for the mechanical stiffness k of a spring washer of the resilient control means 30 to enable the desired changeover to be obtained in the case of damped displacement.

FIG. 2 illustrates the way the dynamic behavior of the mechanical device 1 of the invention is modelled. Under the effect of an impulse, the moving assembly moves a distance x in the direction F relative to the fixed assembly 10, and it moves a distance δ relative to the inertial mass 40.

The displacement changeover takes place at time $T_1$ after the initial instant of the impulse (FIG. 3). Before $T_1$, a first displacement mode obtains during a stage 1 during which the moving assembly 20 is accelerated, and a second displacement mode is obtained after $T_1$, corresponding to a second displacement stage in which the displacement of the moving assembly 20 is damped to have constant speed.

The differential equation for the movement of the mass 40 is then:

$$m(\ddot{x}-\ddot{\delta})-k\delta=0 \qquad (I)$$

using the notation:

$$\omega^2 = \frac{k}{m} \qquad (II)$$

This gives:

$$\ddot{\delta} + \omega^2 \delta = \frac{V_1}{T_1}$$

where $V_1$ is the driving speed.

Thus, at time t=0, the initial conditions are as follows:

$$\delta = \dot{\delta} = 0$$

The general solution of equation II is then as follows:

$$\delta(t) = A \sin \omega t + B \cos \omega t$$

where A and B remain to be determined, and it has the following particular solution:

$$\delta(t) = \frac{V_1}{T_1 \cdot \omega^2}$$

Thus the complete solution is as follows:

$$\delta(t) = A\sin\omega t + B\cos\omega t + \frac{V_1}{T_1 \cdot \omega^2}$$

From the initial conditions, it follows:

$$\delta(0) = B + \frac{V_1}{T_1 \cdot \omega^2} = 0$$

and $$\dot{\delta}(0) = A\omega = 0$$

Whence A=0 and $$B = -\frac{V_1}{T_1 \cdot \omega^2}$$

which gives $$\delta(t) = \frac{V_1}{T_1 \cdot \omega^2}(1 - \cos\omega t)$$

Since t remains below the value $T_1$, which is itself infinitely small, the above expression can be developed in limited form to obtain a simple expression for the equation of motion.

$$\delta(t) = \frac{V_1 \cdot t}{2}$$

Which at the end of stage 1 gives:

$$\delta(T_1) = \frac{V_1 \cdot T_1}{2}$$

and $$\delta(T_1) = \frac{V_1}{2}$$

Since δ is infinitely small, at the beginning of stage 2, it can be treated as though it were 0.

The new initial conditions for t=0 are thus:

δ=0 and $$\delta(T_1) = \frac{V_1}{2}$$

The differential equation is modified:

δ+ω²δ=0

Its general solution is as follows:

δ(t)=C sin ωt+D cos ωt

Feeding in the initial conditions,

δ=0 whence D=0

$$\dot\delta = \frac{V_1}{2}$$

whence $$C = \frac{V_1}{2\omega}$$

Thus $$\delta(t) = \frac{V_1}{2\omega} \cdot \sin\omega t$$

This relative displacement δ of the mass 40 relative to the moving assembly 20 as a function of time is shown in FIG. 4. It can be seen that the maximum relative displacement δ is obtained at one-fourth of the period, i.e. at a time $$t = \frac{T}{4} = \frac{\pi}{2 \cdot \omega}$$

During this time, the axial displacement x of the moving assembly 20 relative to the fixed assembly 10 is limited to:

$$x = X = V_1 \cdot t = \frac{V_1 \cdot \pi}{2 \cdot \omega}$$

whence at the limit of the changeover:

$$\omega = \frac{\pi \cdot V_1}{2 \cdot X}$$

and $$\delta = \frac{X}{\pi} \cdot \sin\omega$$

giving a maximum relative displacement δ:

$$\delta_{max} = \frac{X}{\pi}$$

For example, if the driving speed $V_1$ is to be set at 1 meter per second (m/s) and if the axial displacement x during stage 1 is to be limited to X=1 mm, then calculation shows that ω=1571 rad/s, i.e. k/m=2464.9 kN/m.kg.

Thus, if the spring constant k is given the value 50 N/mm, 100 N/mm, or 200 N/mm, then it is necessary to have respective masses of 20 g, 40 g, and 80 g. This range of stiffness constant is not limiting. Furthermore, for this ratio k/m, the maximum relative displacement δ is $\delta_{max}$=0.3 mm.

Suitable clearance J for proper operation will be about 0.05 mm. The geometry of the resilient means 30 then makes it possible to determine the clearance J. For example, it is possible to use standard Siam-Ringspann washers (ref. A 10 SS 20).

The mechanical device 1 of the invention can be improved by means of diverse variants. Some of these variants are described below, but they are not limiting in any way.

The above description relates to a mechanical device 1 that damps relative displacement between two assemblies 10 and 20 by buckling the resilient control means 30. The device of the invention may include various types of damper means designed to damp the relative displacement of the two assemblies 10 and 20. For example, the damper means may advantageously be constituted by resilient control means 30 comprising at least one washer that operates by buckling, associated with friction means 60 as described in French patent application FR 2 697 881.

It is also shown above that the mechanical device 1 of the invention can include blocking means designed to block relative displacement between the two assemblies 10 and 20 if the friction forces of the friction means against the fixed assembly 10 increase above a limit value. The blocking means can then comprise at least one washer that is rigid in the radial direction, but that operates by wedging. It may or may not give way and release relative displacement if the force driving the displacement exceeds a predetermined threshold.

As described above, mechanical device 1 of the invention can have resilient control means 30 comprising at least one spring washer interposed between the moving assembly 20 and the inertial mass 40. However, the resilient control means 30 may also comprise a spring, e.g. a helical spring, interposed between a washer, or a set of washers, and the abutment 27 of the moving assembly 20.

The mechanical device 1 of the invention may have its inertial mass 40 placed on an intermediate piece 22 associated with the moving assembly 20 and movable on said intermediate piece 22. This variant of the mechanical device 1 is shown in FIG. 5. By way of example, the intermediate piece 22 has a ring 23 disposed circumferentially around the reduced-diameter portion 26 of the moving assembly 20, but leaving sufficient clearance to be movable thereover. The ring 23 has a shoulder 24 projecting radially outwards from the edge of the ring 23 that is further from the free end of the moving assembly 20 engaged in the fixed assembly 10. The shoulder may be in the form of a continuous circle or it may comprise a plurality of elements projecting from the ring 23 and distributed around it. The outside size of the shoulder 24 is less than the inside diameter of the cylinder 11 of the fixed assembly 10 so that the intermediate piece 22 is free to move in translation along the axis O—O relative to the fixed assembly 10.

The inertial mass 40 is then placed around the ring 23 so as to be free to move in translation along the axis O—O over the ring 23. Resilient control means 30 are then placed between the moving mass 40 and the shoulder 24, and spring means 50 are placed between the intermediate piece 22 and the abutment 27 terminating the reduced-diameter portion 26 at its end remote from the free end of the moving assembly 20 engaged in the cylinder 11.

In an advantageous embodiment of the device of the invention, the resilient control means 30 can be constituted by a single spring washer, and the spring means 50 can be constituted by a set of spring washers capable of buckling. In this way, the dynamic behavior in displacement is determined by a single washer which is placed between the moving mass 40 and the shoulder 24, while the axial force of the spring is transferred to all of the other washers situated between the intermediate piece 22 and the abutment 27. The single resilient washer constituting the resilient control means 30 can have stiffness that is smaller than that of each of the washers which together constitute the spring means 50. The single resilient washer is thus deformed more easily by the force of an impulse. By expanding radially, said single resilient washer rubs against the inside wall of the fixed cylinder 11, thereby reinforcing the effect of the inertia. The set of resilient washers constituting the spring means 50 is then subjected to stress. The washers in this set are compressed; their outside circumferences come into contact with the inside wall of the cylinder 11; they buckle; and that gives rise to friction that damps the impulse. The stiffness of the washers constituting the set can be selected to be high so as to maximize the friction forces. Thus the stiffness of the resilient washer constituting the resilient control means 30 is selected to optimize triggering the changeover between the two relative displacement modes between the fixed assembly 10 and the moving assembly 20, while the stiffness of the washers constituting the spring means 50 is selected to optimize damping of said relative displacement.

In another variant of the device of the invention, one or more or even all of the washers of the spring means 50 that are capable of buckling can be replaced by one or more washers that are rigid and capable of wedging between the fixed assembly 10 and the moving assembly 20 when they are stressed.

Advantageously, and in order to optimize the damping or blocking friction, the mechanical device 1 may include friction means between the fixed assembly 10 and the moving assembly 20 (FIG. 6).

For example, a shoe 60 can be placed between the cylinder 11 of the fixed assembly 10 and the resilient control means 30. In this case, the shoe 60 can be a circularly symmetrical bushing that is split longitudinally so as to have an outside diameter that is smaller than the inside diameter of the cylinder 11 so as to leave radial clearance J. Each end edge of the shoe 60 has a shoulder 61 extending radially inwards from the shoe 60 towards the reduced diameter portion 26.

In this mechanical device, spring means 50 are constituted by spring washers 51 of outside diameter at rest that is approximately equal to or slightly smaller than the inside diameter of the shoe 60. The inside diameter of the washers 51 is slightly greater than the outside diameter of the portion 26. The washers 51 have main surfaces that extend at an angle lying in the range 5° to 10° relative to a plane perpendicular to the axis O—O.

The assembly comprising the shoe 60 and the spring means 50 may be of a mass that is appropriate for simultaneously constituting the inertial mass 40.

The resilient control means 30 are constituted in this case by a spiral spring situated between the moving assembly 20 and the spring means 50.

At rest, an axial clearance J' is left between the abutment 27 and the shoulder 61 at the end of the shoe remote from the free end of the moving assembly 20. The technical effect of the clearance J' has already been described, for example in French patent application FR 2 697 881.

The description above relates to devices in which the moving assembly 20 slides in the fixed assembly 10, with damping or blocking being performed on the inside surface of the cylinder 11. However, devices of the invention can also be designed in such a manner that the rubbing takes place on a portion of the moving assembly. It is also possible to design a cylinder 21 that is fixed while the cylinder 11 is the moving cylinder.

The devices of the invention as described above can also be included in mechanical displacement control systems that are more complex. Under such circumstances, a device of the invention can be placed in series or in parallel with at least one shock absorber or blocking system of any kind. This makes it possible to obtain changeovers between damped displacement and free displacement, and vice versa, between two damped displacements having different characteristics, or indeed a changeover between damped displacements and blocked displacement and vice versa, or even a changeover between the blocked state and displacement that is free, or vice versa.

What is claimed is:

1. A mechanical device for controlling changeover between two modes of relative displacement between two objects as a function of a time profile of the relative displacement, the mechanical device comprising:

two assemblies capable of moving in guided relative translation, one assembly being fixed, and the other assembly moving;

resilient control means interposed between the two assemblies with a controlled clearance defined between said resilient control means and at least one of said two assemblies to define the two modes of relative displacement; and an inertial mass associated with one of the assemblies and adapted to act selectively on the control means as a function of the time profile of relative displacement in order to modify the clearance and to change between the two modes of relative displacement, wherein the resilient control means are dimensioned to operate by buckling upon the application of a force which occurs when the relative displacement of the two assemblies increases, and wherein the resilient control means are dimensioned so that in a first mode of relative displacement said controlled clearance existing between said resilient control means and at least one of said two assemblies allows a free displacement of the moving assembly in regards to the fixed one, while in the second mode of relative displacement as a result of deformation of the resilient control means by the inertial mass, said controlled clearance is cancelled so that the displacement of said other moving assembly is damped.

2. A device according to claim 1, including damper means designed to damp relative displacement between the two assemblies.

3. A device according to claim 2, wherein the damper means comprise at least one washer operating by buckling upon the application of a force which occurs when the relative displacement of the two assemblies increases.

4. A device according to claim 1, including friction means between the fixed assembly and the moving assembly.

5. A device according to claim 4, further comprising blocking means for blocking relative displacement between the two assemblies if a friction force increases beyond a limit value.

6. A device according to claim 5, wherein the blocking means comprise at least one washer that is rigid in a radial direction and that operates by wedging upon the application of a force which occurs when the relative displacement of the two assemblies increases.

7. A device according to claim 6, wherein the washer that is rigid in the radial direction is designed to give way and release relative displacement if the force imparting said relative displacement is greater than a predetermined threshold.

8. A device according to claim 1, wherein the resilient control means comprise at least one resilient washer interposed between the moving assembly and the inertial mass.

9. A device according to claim 1, wherein the inertial mass is placed on an intermediate piece associated with the moving assembly.

10. A device according to claim 9, wherein spring means are placed between the intermediate piece and the moving assembly.

11. A device according to claim 1, wherein at least one friction shoe is placed between a cylinder of the fixed assembly and the resilient control means.

12. The use of the device according to claim 1, in mechanical systems for controlling accelerated displacement.

13. The use of a device according to claim 1, in a high-impulse projectile launcher.

14. A mechanical system for controlling displacement, comprising a device according to claim 1 placed in series or in parallel with at least one shock absorber or blocking means.

* * * * *